United States Patent [19]

Nebhuth et al.

[11] Patent Number: 4,841,672
[45] Date of Patent: Jun. 27, 1989

[54] DEVICE FOR PROTECTION FROM THE SUN

[75] Inventors: Thomas Nebhuth, Coburg; Herbert Loehner, Kueps, both of Fed. Rep. of Germany

[73] Assignee: Siemens Aktiengesellschaft, Berlin and Munich, Fed. Rep. of Germany

[21] Appl. No.: 69,727

[22] Filed: Jul. 6, 1987

[30] Foreign Application Priority Data

Jul. 4, 1987 [DE] Fed. Rep. of Germany ....... 3622564

[51] Int. Cl.$^4$ ............................................. E05F 15/20
[52] U.S. Cl. ............................................ 49/25; 49/71;
  160/166.1; 126/425; 250/203 R; 350/263
[58] Field of Search ....................... 126/419, 425, 440;
  49/25, 71, 463; 250/548, 203 R, 209, 491.1, 261,
  215, 571, 517.1, 491.1; 350/262, 263, 264, 265

[56] References Cited

U.S. PATENT DOCUMENTS

| | | | |
|---|---|---|---|
| 2,225,011 | 12/1940 | Jones | 49/71 |
| 3,448,273 | 6/1969 | Webb | 250/203 R |
| 3,478,219 | 11/1969 | Nutz | 250/203 R |
| 4,117,325 | 9/1978 | Holle et al. | 250/209 |
| 4,154,219 | 5/1979 | Gupta | 126/439 |
| 4,223,214 | 9/1980 | Dorian et al. | 250/203 R |
| 4,486,073 | 12/1984 | Boyd | 160/236 |
| 4,517,960 | 5/1985 | Bartenbach | 126/440 |
| 4,742,813 | 5/1988 | Riehl et al. | 126/425 |
| 4,769,531 | 9/1988 | Malek | 250/203 R |

Primary Examiner—Kenneth J. Dorner
Assistant Examiner—Gerald A. Anderson
Attorney, Agent, or Firm—Adel A. Ahmed

[57] ABSTRACT

A solar protection device includes slats of refractive material rotatable about a longitudinal axis, having an even, flat upper side and having on their lower side prisms arranged serially without gaps and running parallel to the longitudinal axis. In order to maintain the condition for retroreflection with variations of the sun's position, the angle of inclination to the horizontal of the slats must be readjusted from time to time, at least seasonably. For automatic adjustment thereof a light sensing arrangement of two light sensors arranged oppositely on both cathetal legs of one of the prisms whose hypotenuse is formed by the upper side of the rotatable slat. Control by a drive and associated electronics is undertaken and continued as long as solar rays impinge on one of the light sensors with intensity exceeding a predetermined illumination level.

19 Claims, 3 Drawing Sheets

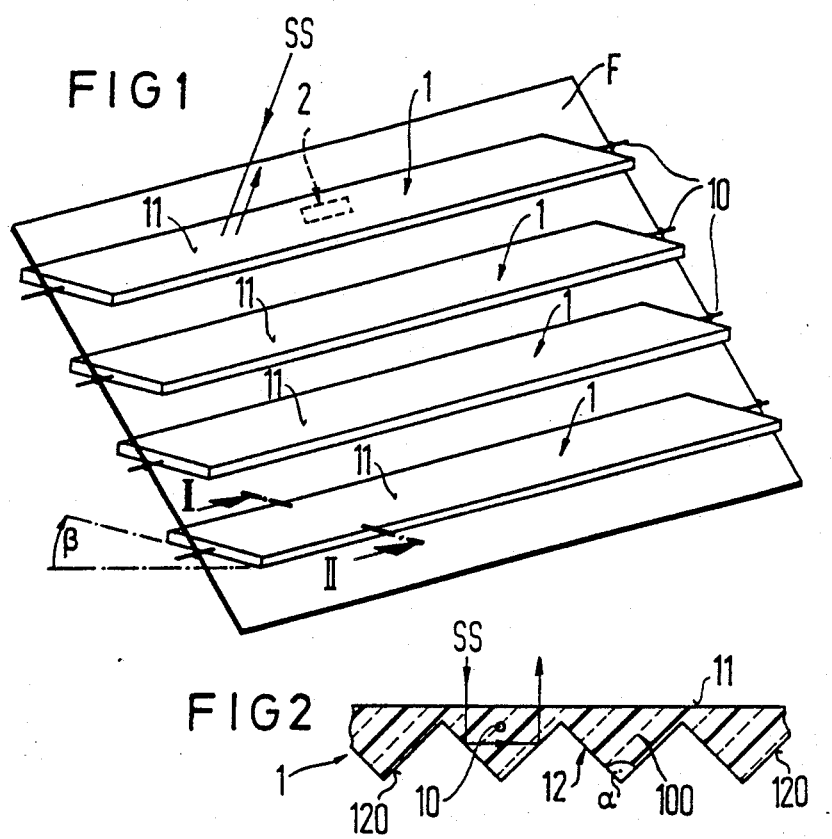

DEVICE FOR PROTECTION FROM THE SUN

The present invention relates to a device for protection from the sun for a window opening in a planar facade including at least one slat of refractive material, the slot being arranged in the window opening, being rotatable about a longitudinal axis, having an even upper side, and having an under side having thereon a plurality of prisms, the prisms being arranged adjacent one another, without gaps, and running serially parallel to the longitudinal axis, and, in reference to an auxiliary plane perpendicular to the longitudinal axis, having a form of an isosceles triangle having a hypotenuse formed by a plane of the under side and having the other two sides including an internal angle between them such as to fulfill the condition for retroreflection.

A device for protection from the sun known from publication EP No. 0090 830 B1, incorporated herein by reference, has a relatively small blocking region. In comparison with earlier known retroreflecting devices for protection from the sun, that device lets much zenith or vertical point light into the room behind it and nevertheless requires little adjustment in the course of the day and over the seasons.

In the European patent application No. 8610 29 59.3 it has been proposed to attach a light sensor arrangement, having a shadowing device for two light sensors whose electrical characteristics depend on the extent of the irradiated sensor surface and on the intensity of the radiation, to at least one slat in a window opening in a planar facade for the adjustment of slats rotatable along their longitudinal axis as a function of solar elevation.

A task of the invention is to provide a further solution for providing adjustment with the use of a light sensor arrangement which does not require a shadowing device and furthermore takes into account in the control process the shading characteristics of the device for protection from the sun.

The present invention provides a solution as will be described, using as a point of departure a device for protection from the sun as has been described by way of introduction and a solar elevation readjustment control utilizing a light sensor arrangement.

It is herein recognized that a readjustment control process of at least one slat need only take place if solar rays enter the space behind through the prisms of the slat. If a light sensor arrangement with a shadowing device is arranged on its upper side, the slat must then be adjusted such that the solar rays arrive at the slat parallel to a plane defined by lines normal to the slat surface. The range of adjustment of the light sensor arrangement with a shadowing device is thereby limited to an angular rotation of about ±4°. This narrow range of adjustment falls far short of fully utilizing the blocking range of the slot in relation to angular rotation.

The arrangement of the sensors on the under side of the slat in the manner provided in accordance with the invention, in accordance with an appropriately selected response threshold, makes the blocking range of the device for protection from the sun fully available for the required control, and furthermore, this is independent of whether the sun shines in a direction parallel to lines normal to the slat surface or whether its rays exhibit a linite angle thereto. The number of adjustment procedures over the course of a solar year is thereby considerably reduced with a considerably simpler form and arrangement of the light sensor arrangement.

The invention will be described in more detail with the aid of the drawing, in which:

FIG. 1 shows a perspective view of a window opening with slats arranged therein;

FIG. 2 shows a cross-section along line II—II through a slat according to FIG. 1;

Figure 3:
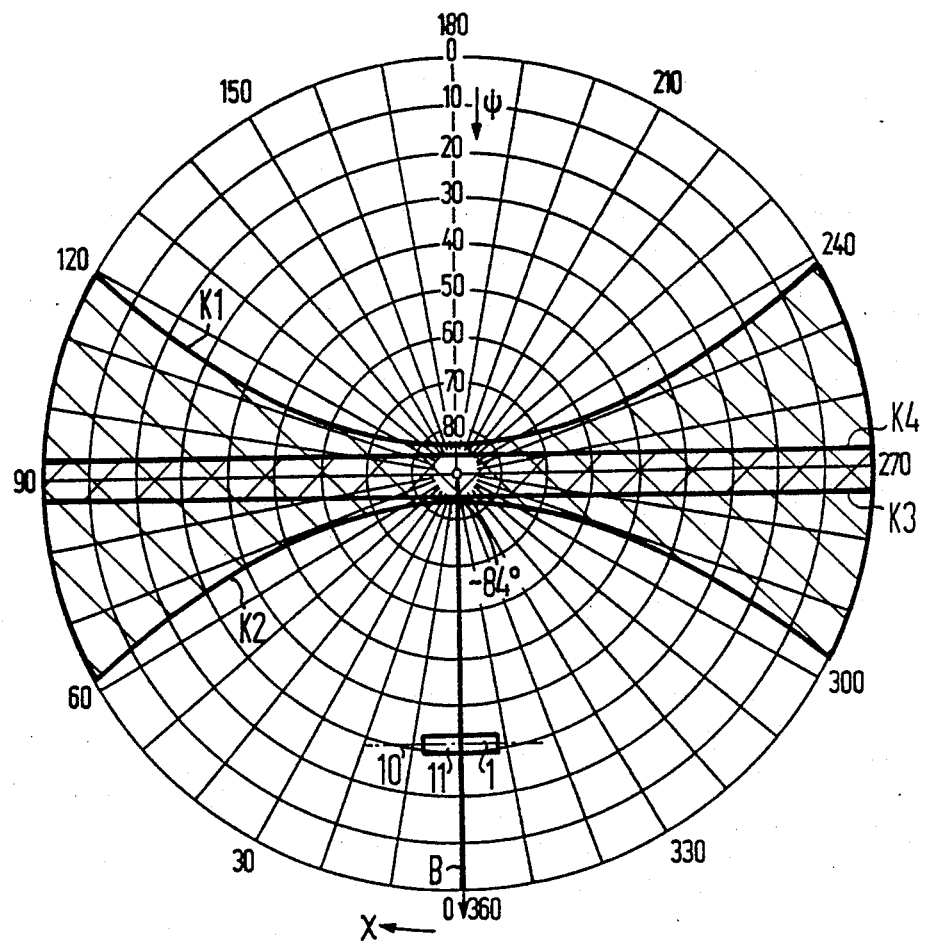
FIG. 3 shows a catoptric or reflection diagram of a slat according to FIG. 1.

The known device for protection from the sun shown in FIGS. 1 and 2 comprises a plurality of slates 1 which are rotatable about a longitudinal axis 10, which are arranged in a window opening F, and which exhibit an angle of inclination $\beta$ to a horizontal plane. Each slat is made of refractive material, for example, plastic and has the cross-section shown in FIG. 2. It has an even or flat upper side which is turned toward the sun's rays SS, see FIG. 1. Prisms 100 are arranged adjacent one another, without gaps, on the under side and run serially parallel to longitudinal axis 10, being defined or delimited by substantially cathetal legs 120 i.e., the legs other than the hypotenuse in a substantially right-angled triangle, and upper side 11, forming the substantially hypotenuse leg, i.e., in a substantially right-angled triangle, the leg opposite the substantially right angle. The individual prisms exhibit a cross-section in the form of a substantially isosceles triangle, wherein the internal angle included between the substantially cathetal legs is selected such that, subject to conditions to be described below, solar rays impinging on upper surface 11 are reflected back again to the outside, that is, they cannot enter the space behind window opening F. One of the conditions for this "retroreflection", based on total reflection, is that the interior angle $\alpha$ be 90°±3°, depending on the material.

A light sensor arrangement 2, to be described later in greater detail, is provided for one of slats 1 and is indicated in FIG. 1 by dashed lines.

FIG. 3 shows the reflection diagram of a slat in accordance with FIGS. 1 and 2 using an internal angle $\alpha$ of 90°: angles are entered radially from "azimuth planes" which are perpendicular to the upper side 11 of the slat and whose azimuth angle $\alpha$ is selected departing from reference straight line B which runs perpendicularly to the longitudinal axis of the slat.

Elevation angles $\psi$ from 0° to 90° are entered in concentric circles. The stop region of the slat is shown hatched in the reflection diagram and is delimited by limit curves K1 and K2. Every point in the stop region therefore has an azimuth angle $\chi$ and an elevation angle $\psi$. All rays impinging on the upper side 11 of a slat whose parameters $\chi$ and $\psi$ lie in the stop region will be totally reflected. All light rays which impinge on the upper side with a paramenter combination falling outside the stop region will be allowed through into the interior space. The width of the step region decreases with increasing deviation of the interior angle $\alpha$ from 90°.

A further cross-hatched area with limit curves K3 and K4 is shown within the hatched stop region. With readjustment control of the angular position about the longitudinal axis 10 of slats 1 of FIGS. 1 and 2 in dependence on solar elevation, control is limited to this cross-hatched region if the light sensor arrangement 2 is mounted on the upper side 11 of a slat 1 in association with a shadowing device as had been already proposed.

By arranging the light sensing arrangement 2 on the under side 12 of the slat, the whole of the hatched stop region within limit curves K1 and K2 can be rendered usable for resetting. To this end, the recognition is important that the illumination level Ea exhibits such a great difference between, on the one hand, when the sky is overcast and, on the other hand, when the sky is clear, that this difference can be employed as a control criterion.

Figure 4:
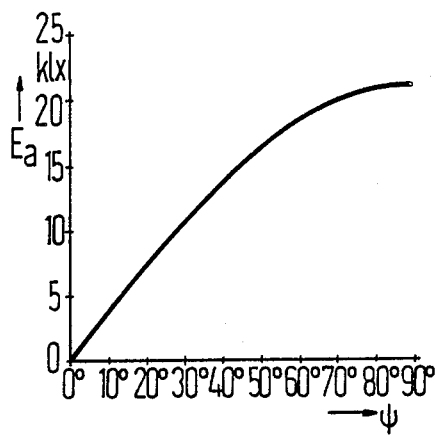
FIG. 4 shows a diagram of illumination level against angle of solar elevation for an overcast sky.

FIG. 4 shows a plot of the illumination level Ea in klx for an overcast sky as a function of solar elevation $\psi$. As may be seen from the curve, the illumination level does not even reach 22klx even at the highest solar elevation. The picture is quite different when the sky is clear.

Figure 5:
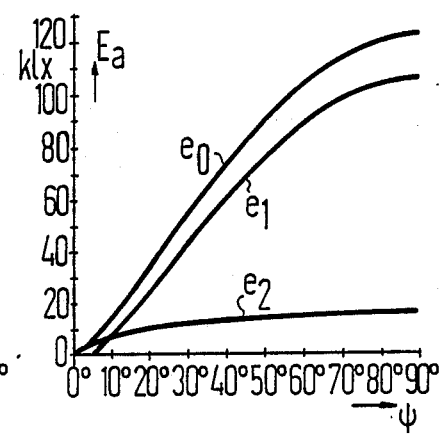
FIG. 5 shows a further diagram of illumination level against angle of elevation for a clear sky.

The corresponding diagram is shown in FIG. 5. The illumination level against elevation angle $\psi$ is shown by the curve el, which is a composite of the portion arriving from the sky and the portion from the sun. The sky portion is again shown by curve el and the sun portion by e2. As the diagram shows, an illumination level of Ea of 25klx is already reached in this case at an elevation angle $\psi$ of about 15° above the horizon. A satisfactory control criterion is thus achieved for the utilization of light sensors on the under side of a slat if the response threshold for the automatic readjustment control is set high enough such that the control electronics is only brought into operation when sunlight going through the slat is of sufficient intensity and the resetting process is ended as soon as the illumination level again falls below the response threshold value.

As has been made clear in connection with the diagrams of FIGS. 4 and 5, an illumination level of around 25klx represents a preferred response value.

Figure 6:
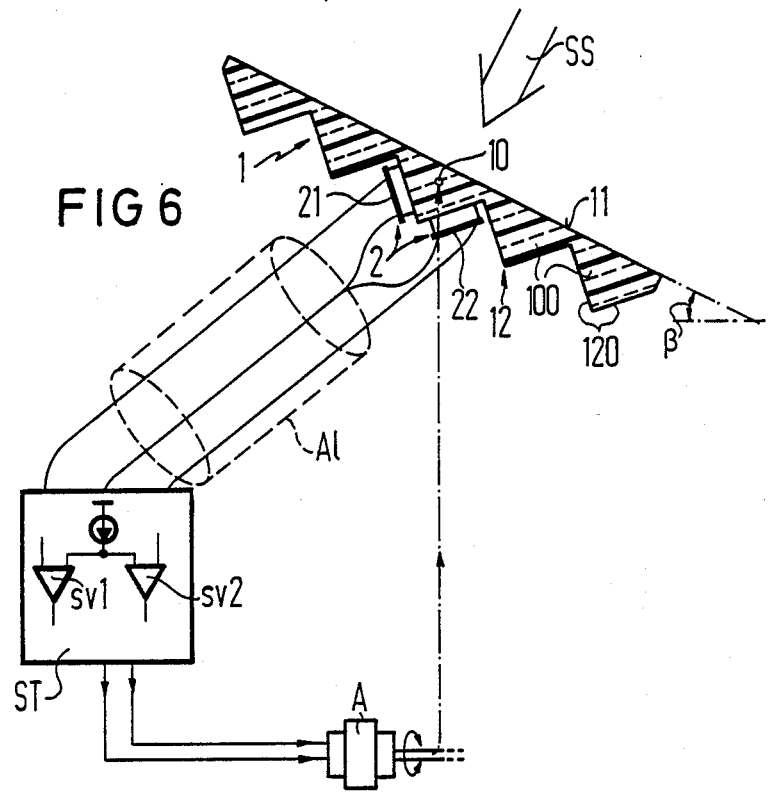
FIG. 6 shows a cross-section of a slat according to FIG. 2 with a light sensor arrangement.

FIG. 6 shows the arrangement of light sensor arrangement 2 on the under side of a slat 1 corresponding to FIG. 2. The light sensors 21 and 22, which exhibit the same electrical characterstics, are herein disposed oppositely on both cathetal legs 120 of prism 100 which includes therein the longitudinal axis 10 about which slat 1 is rotatable. Light sensors 21 and 22, representing opto-electronic transducers, provide an electrical quantity representative of the illumination level Ea by way of coupling line AL to two threshold level switches sv1 and sv2 on the input side of control electronics ST. Each of the two threshold level switches is made to correspond to a defined direction of rotation of the drive A to be controlled. Readjustment by way of drive A of the angle of inclination of slat 1 to the horizontal starts and continues in the direction of rotation determined by the responding threshold level switch sv1 or sv2, as the case may be, until the illumination level Ea at the light sensor 21 or 22, as the case may be, associated with the responding threshold level switch has again fallen below the predetermined response value of 25klx, that is, the retro-reflection of the slat with regard to the impinging sun's rays SS is again fulfilled.

The response threshold of threshold level switches sv1 and sv2 of control electronics ST can be realized by employing an adjustable voltage value with which the voltage levels proportional to the illumination strength provided by light sensors 21, 22 are compared and, depending on the comparison result, a readjustment of the angle of inclination of slat 1 is brought about as needed.

Devices for protection from the sun having controllable adjustment find application particularly for windows in south facing building facades as well as for roof sky-lights. The slats are then arranged to be enclosed between glass panes and are thus protected from damp and dust.

We claim:

1. A device for protection from the sun for a window opening in a planar facade including at least one slat of refractive material, said slat being arranged in said window opening, being rotatable about a longitudinal axis, having an even upper side, and having an under side having a plurality of prisms thereon, said prisms being arranged adjacent one another, without gaps, and running serially parallel to said longitudinal axis, and, in reference to a section plane perpendicular to said longitudinal axis, having a form of an isosceles triangle having a first leg and two other substantially equal legs, said first leg being formed by a plane of said under side and having an internal angle $\alpha$ included between said two other legs such as to fulfill a condition for retroreflection so that solar rays impinging on said upper side are reflected back, and wherein at least one slat in a window opening has affixed thereto a light sensor arrangement including first and second light sensors, said sensors cooperating with electronic control means for controlling drive means for controlling a slat about the longitudinal axis thereof, so as to maximize retroreflection for direct solar radiation substantially independently of solar elevation, comprising:

said first and second light sensors of said light sensor arrangement being oppositely arranged at said two other legs of one of said prisms of said plurality on said under side of a slat; and said electronic control means including first and second threshold level switch means, corresponding respectively to first and second directions of rotation of said drive means associated with said first and second light sensors, respectively.

2. A device for protection from the sun in accordance with claim 1, wherein said first and second threshold level switch means exhibit a threshold such that response for controlling said drive means occurs only when sunlight of an intensity exceeding a predetermined level impinges on the respective light sensor associated therewith.

3. A device for protection from the sun in accordance with claim 2, wherein said threshold level corresponds to an illumination level of greater than 25klx.

4. A device for protection from the sun in accordance with claim 1, wherein said angle $\alpha$ is substantially a right angle and said first leg is the hypotenuse of said triangle.

5. A device for protection from the sun in accordance with claim 4, wherein said first and second threshold level switch means exhibit a threshold such that response for controlling said drive means occurs only when sunlight of an intensity exceeding a predetermined level impinges on the respective light sensor associated therewith.

6. A device for protection from the sun in accordance with claim 5, wherein said threshold level corresponds to an illumination level of greater than 25klx.

7. A device for protection from the sun for a window opening in a planar facade including at least one slat of refractive material, said slat being arranged in said window opening, being rotatable about a longitudinal axis, having an even upper side, and having an under side having a plurality of prisms thereon, said prisms being arranged adjacent one another, without gaps, and running serially parallel to said longitudinal axis, and, in reference to a section plane perpendicular to said longitudinal axis, having a form of an isosceles triangle having a hypotenuse and a pair of cathetal legs, said hypotenuse being formed by a plane of said under side and having an internal angle included between said cathetal legs such as to fulfill a condition for retroreflection so that solar rays impinging on said upper side are reflected back, and wherein at least one slat in a window opening has affixed thereto a light sensor arrangement including first and second light sensors, said sensors cooperating with electronic control means for controlling drive means for controlling a slat about the longitudinal axis thereof, so as to maximize retroreflection for direct solar radiation substantially independently of solar elevation, comprising:

said first and second light sensors of said light sensor arrangement being oppositely arranged at said cathetal legs of one of said prisms of said plurality on said under side of a slat; and said electronic control means including first and second threshold level switch means, corresponding respectively to first and second directions of rotation of said drive means associated with said first and second light sensors, respectively.

8. A device for protection from the sun in accordance with claim 7, wherein said first and second threshold level switch means exhibit a threshold such that response for controlling said drive means occurs only when sunlight of an intensity exceeding a predetermined level impinges on the respective light sensor associated therewith.

9. A device for protection from the sun in accordance with claim 8, wherein said threshold level corresponds to an illumination level of greater than 25klx.

10. A device for protection from the sun in accordance with claim 7, wherein said angle $\alpha$ is substantially a right angle and said first leg is the hypotenuse of said triangle.

11. A device for protection from the sun in accordance with claim 10, wherein said first and second threshold level switch means exhibit a threshold such that response for controlling said drive means occurs only when sunlight of an intensity exceeding a predetermined level impinges on the respective light sensor associated therewith.

12. A device for protection from the sun in accordance with claim 11, wherein said threshold level corresponds to an illumination level of greater than 25klx.

13. A solar protection device including a plurality of slats of refractive material rotatable about a longitduinal axis, each slat having a substantially planar upper side and having a lower side with prisms arranged thereon serially running parallel to said longitudinal axis without gaps, said prisms having respective first and second legs and having a third leg formed by a plane portion of said lower side of said slat, said device comprising:

first and second light sensors oppositely arranged on said first and second legs, respectively, of one of said prisms; and control means coupled for rotating said slats, said control means being further coupled to said light sensors for rotation said slats in one of first and second directions responsive to a light intensity exceeding a predetermined threshold level at a respective one of said first and second light sensors.

14. A solar protection device as recited in claim 13, wherein said first and second legs of said prism include an angle $\alpha$ therebetween fulfilling a condition for retroreflection.

15. A solar protection device as recited in claim 14, wherein said threshold level is selected such that said condition for retroreflection for direct solar radiation is met substantially independently of solar elevation.

16. A solar protection device as recited in claim 15, wherein said threshold level corresponds to an intensity of 25klx.

17. A solar protection device as recited in claim 16, wherein said angle $\alpha$ is substantially a right angle.

18. A solar protection device as recited in claim 13, wherein said threshold level corresponds to an intensity of 25klx.

19. A solar protection device as recited in claim 14, wherein said angle $\alpha$ is substantially a right angle.

* * * * *

UNITED STATES PATENT AND TRADEMARK OFFICE
CERTIFICATE OF CORRECTION

PATENT NO.  : 4,841,672

DATED       : June 27, 1989

INVENTOR(S) : Nebhuth et al.

It is certified that error appears in the above-identified patent and that said Letters Patent is hereby corrected as shown below:

Cover Page
Section (30) delete "Jul. 4, 1987" and in its place insert
--Jul. 4, 1986--.

Signed and Sealed this

Twenty-seventh Day of August, 1991

Attest:

HARRY F. MANBECK, JR.

Attesting Officer

Commissioner of Patents and Trademarks